(12) United States Patent
Stubbs et al.

(10) Patent No.: US 10,504,056 B1
(45) Date of Patent: Dec. 10, 2019

(54) LEARNING FORCE LIMITS OF ITEMS FOR USE IN GCU OPTIMIZATION

(71) Applicant: Amazon Technologies, Inc., Seattle, WA (US)

(72) Inventors: Andrew Stubbs, Waltham, MA (US); Ennio Claretti, Somerville, MA (US); Andrew D. Marchese, Concord, MA (US); Samuel Rubin Barrett, Somerville, MA (US)

(73) Assignee: Amazon Technologies, Inc., Seattle, WA (US)

( * ) Notice: Subject to any disclaimer, the term of this patent is extended or adjusted under 35 U.S.C. 154(b) by 388 days.

(21) Appl. No.: 15/371,022

(22) Filed: Dec. 6, 2016

(51) Int. Cl.
*G06Q 10/08* (2012.01)
*G05B 19/402* (2006.01)
*G01L 5/00* (2006.01)
*G06F 16/23* (2019.01)

(52) U.S. Cl.
CPC .......... *G06Q 10/087* (2013.01); *G01L 5/0028* (2013.01); *G05B 19/402* (2013.01); *G05B 2219/39322* (2013.01); *G06F 16/235* (2019.01)

(58) Field of Classification Search
CPC .................................................... B25J 9/0081
USPC ......................................................... 705/28
See application file for complete search history.

(56) References Cited

U.S. PATENT DOCUMENTS

| | | | |
|---|---|---|---|
| 3,804,270 | A | 4/1974 | Michaud et al. |
| 8,280,547 | B2 | 10/2012 | D'Andrea et al. |
| 9,087,314 | B2 | 7/2015 | Hoffman et al. |
| 9,457,477 | B1 | 10/2016 | Rublee et al. |
| 9,492,923 | B2 | 11/2016 | Wellman et al. |
| 2015/0032252 | A1 | 1/2015 | Galluzzo et al. |
| 2016/0167227 | A1 | 6/2016 | Wellman et al. |
| 2016/0229050 | A1* | 8/2016 | Wang .................... B25J 9/1689 |
| 2017/0039514 | A1 | 2/2017 | Jones et al. |

OTHER PUBLICATIONS

U.S. Appl. No. 15/371,077, U.S. Patent Application, filed Dec. 6, 2016, Titled: Variable Compliance EOAT for Optimization of GCU.

* cited by examiner

*Primary Examiner* — Russell S Glass
(74) *Attorney, Agent, or Firm* — Kilpatrick Townsend & Stockton LLP

(57) ABSTRACT

Described herein are techniques for optimizing gross cubic utilization of inventory space by compressing items into closer proximity. In some embodiments, the inventory system selects an initial force limit to which an item to be stored may be subjected. The inventory system may cause a robotic arm to grasp the item and to push that item into a determined storage location. The inventory system then pushes the item into the storage location while applying a force up to the initial force limit to the item. While monitoring the position of the item, the inventory system may detect that the changes in position of the item are decreasing or stopping and determine that the item is approaching its force limit. The inventory system then updates database records with the force limit associated with the item.

20 Claims, 8 Drawing Sheets

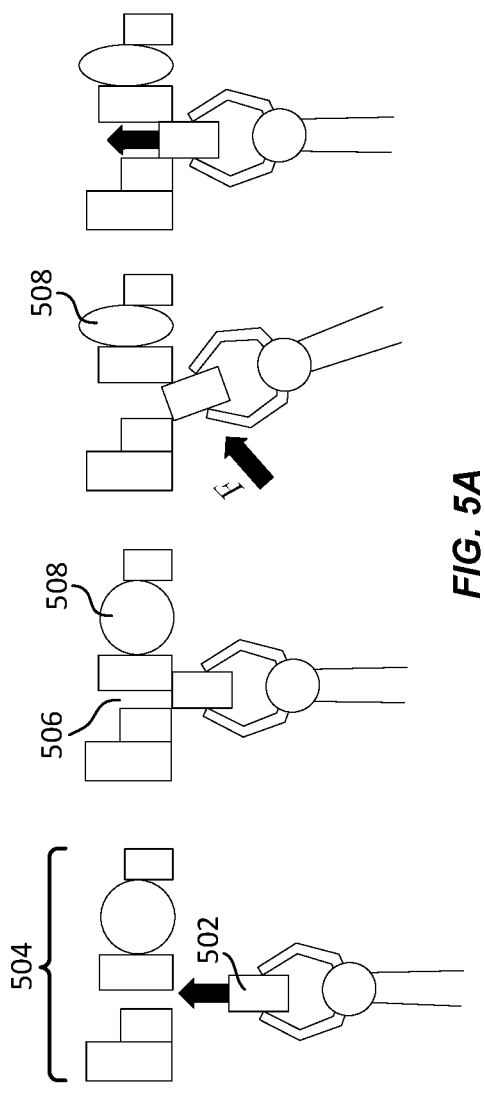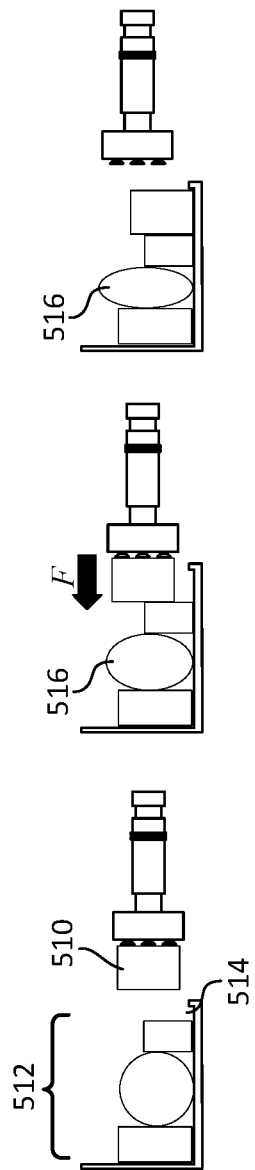
FIG. 5A
FIG. 5B

LEARNING FORCE LIMITS OF ITEMS FOR USE IN GCU OPTIMIZATION

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become nontrivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

Additionally, in high-capacity inventory systems (e.g., inventory systems that manage thousands of items per day), there is a need to optimize the storage of inventory items in order to better utilize the storage space available. In these inventory systems, the operator of a high-capacity inventory system may need to optimize gross cubic utilization (GCU) of storage space. In inventory systems that utilize robotic system components for item storage and retrieval, items maintained in the inventory system are often stored in a way that does not optimize GCU (e.g., there is significant space between the items) since it is difficult for robotic system components to stow items in tight spaces. This is made more difficult in that conventional robots are often unaware of force limits associated with particular items. Without knowledge of those force limits, these conventional robots are unable to optimize GCU by tightly packing inventory.

BRIEF DESCRIPTION OF THE DRAWINGS

Various embodiments in accordance with the present disclosure will be described with reference to the drawings, in which:

FIG. 5A illustrates a first technique for storing items using force limit/compressibility data in accordance with embodiments of the disclosure;

FIG. 5B illustrates a second technique for storing items using force limit/compressibility data in accordance with embodiments of the disclosure;

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and various types of material handling equipment for moving the inventory and inventory holders within the system. Humans have the ability to sense when an item is going to be damaged before it is actually damaged by feeling the item flex in their hand. Conventional robots do not have this ability, but the disclosure describes embodiments in which an inventory system may learn what forces can be applied to an item. Forces learned for a particular item may be stored in a database and used for storage of the item.

In accordance with at least some embodiments, an inventory system may receive instructions to store an item. The inventory system may identify a storage location appropriate for the item, and may determine an initial force limit that may be applied to the item during storage of that item. A robotic arm may then move the item proximate to the identified storage location and may push the item into the storage location against other items in the vicinity of the storage location by applying the determined force. The inventory system may then monitor changes in the position of the item while applying the determined force to the item. As the change in position of the item decreases, the inventory system may update the force limit associated with the item based on the change in position. This updated force limit may be used in future interactions with the item.

Figure 1:
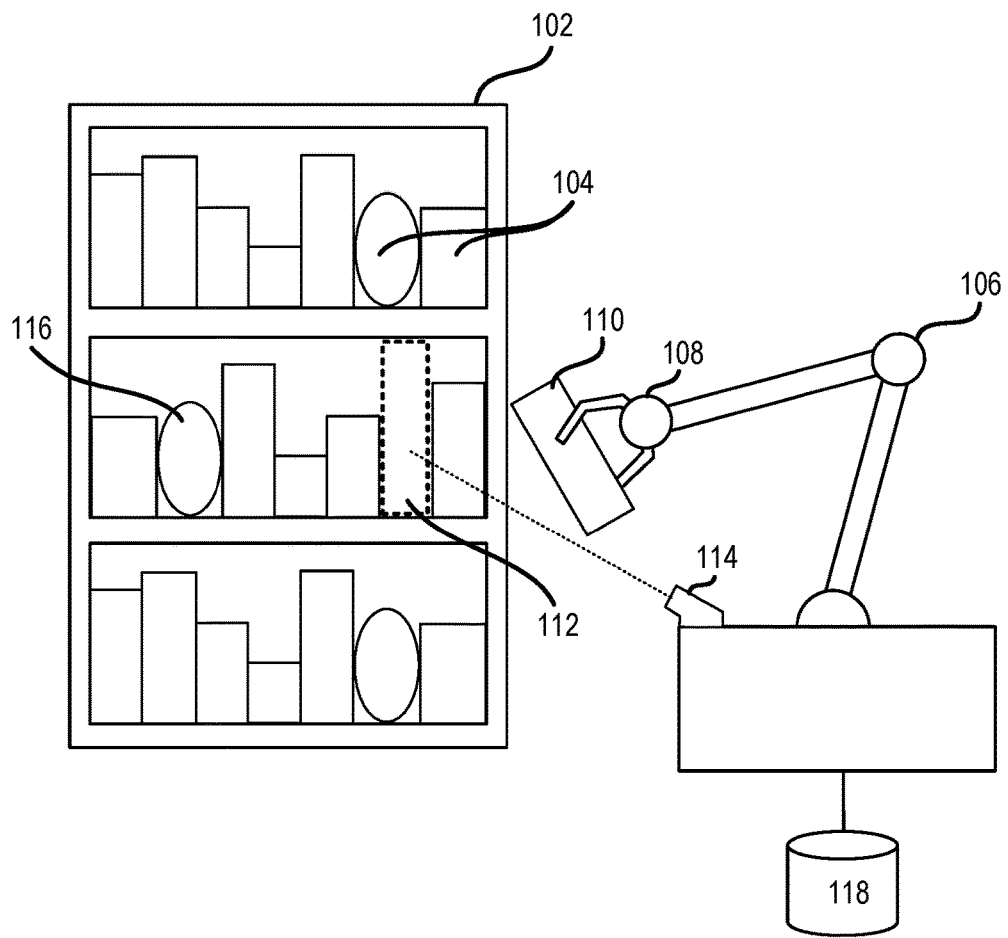
FIG. 1 illustrates aspects of an automated inventory system in accordance with at least some embodiments of the disclosure.

FIG. 1 illustrates aspects of an automated inventory system in accordance with at least some embodiments of the disclosure. In the depicted inventory management system, an inventory holder 102, or another suitable item storage unit, may contain a number of inventory items 104 managed by the inventory system. In at least some embodiments, the inventory management system may additionally include a robotic arm assembly 106. The robotic arm assembly may include an end-of-arm tool (EOAT) 108 configured to stow and/or retrieve an item 110 from a stowage space 112. In some embodiments, the inventory system may include one or more input sensors 114 configured to capture information related to the inventory system.

An inventory holder 102 may comprise any suitable form of inventory holder. In some embodiments, the inventory holder 102 may be mobile, in that it may be configured to be moved (e.g., by a conveyor, a robot, and/or a mobile drive unit). In some embodiments, the inventory holder 102 may comprise a tote, bin, bag, or shelving unit.

In some embodiments, the robotic arm assembly 106 may be any device configured to stow and/or retrieve items from an inventory holder 102. In some embodiments, the robotic arm assembly 106 may include an EOAT 108 configured to grasp and/or otherwise manipulate items. The robotic arm assembly 106 may operate in accordance with instructions provided by the inventory management system to stow an item in, or retrieve the item from, a particular placement location. A placement location may comprise any location in which an item may be stowed, including a storage location within an inventory holder, a storage bin, or a shipping container.

An input sensor 114 may comprise one or more sensors (of like or varying type) arranged to detect the item 110 while the item 110 is being manipulated by the inventory system. Input obtained by an input sensor 114 may take a variety of forms of data input types, including, but not limited to, audio data, visual data, and/or biometric data. In some embodiments, the obtained input may be processed by one or more system components. For example, image input data may be processed using one or more image processing techniques in order to identify aspects of the inventory system. In particular, image information obtained by an input sensor 114 may be used to identify one or more items 104 and/or an open storage space 112. In some embodiments, the image information may be processed to determine dimension specifications for an item or storage space (e.g., width, height, depth, etc.). The input sensor 114 communicates detected attributes, such as a weight, geometric characteristics (e.g., size, position or orientation), electrical conductivity, magnetic properties, surface characteristics (e.g., how slippery or porous the item is), deformability, and/or structural integrity of the item 110, to a controller of the robotic arm assembly 106. The detected attributes may also include a unique identifier of the item 110, such as a barcode- or RFID-encoded serial number. Based on the detected attributes, the controller may access an item database, such as to access a record for the inventory item 110. The record can include information about attributes of the item, such as weight, shape, size, or other physical characteristics of the item. Based on the record from the item database and/or the detected attributes from the input sensor 114, the controller may determine an appropriate pose and/or storage strategy for the item 110 or items with similar characteristics. In some embodiments, the controller for the robotic arm assembly 106 may select an appropriate grasping strategy based on a pose that the item is to be stowed in. In some embodiments, the input sensor 114 may include one or more sensors configured to detect an amount of force applied to the robotic arm. In these embodiments, input provided by the one or more force detection sensors may be used to control a level of compliance in the robotic arm and/or an amount of force applied by the robotic arm.

In accordance with at least some embodiments, at least some items of the one or more items 104 may be compressible items 116 (e.g., items that may be at least partially compressed without being structurally compromised or damaged). The inventory system may maintain information on force limits associated with each item in the set of items 104 in force limit data 118.

The American Section of the International Association for Testing Materials (ASTM) is an international standards organization that develops and publishes voluntary consensus technical standards for a wide range of materials, products, systems, and services. For items stored in packages, the ASTM provides a compression test that may be used to estimate the compressive resistance of some packaging types (ASTM Standard D642 Test Method for Determining Compressive Resistance of Shipping Containers, Components, and Unit Loads). However, no conventional technique for assessing force limits has all the benefits of techniques in accordance with at least one embodiment of the invention. The current disclosure provides such techniques while preventing damage to inventory items.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communication protocol.

Figure 2:
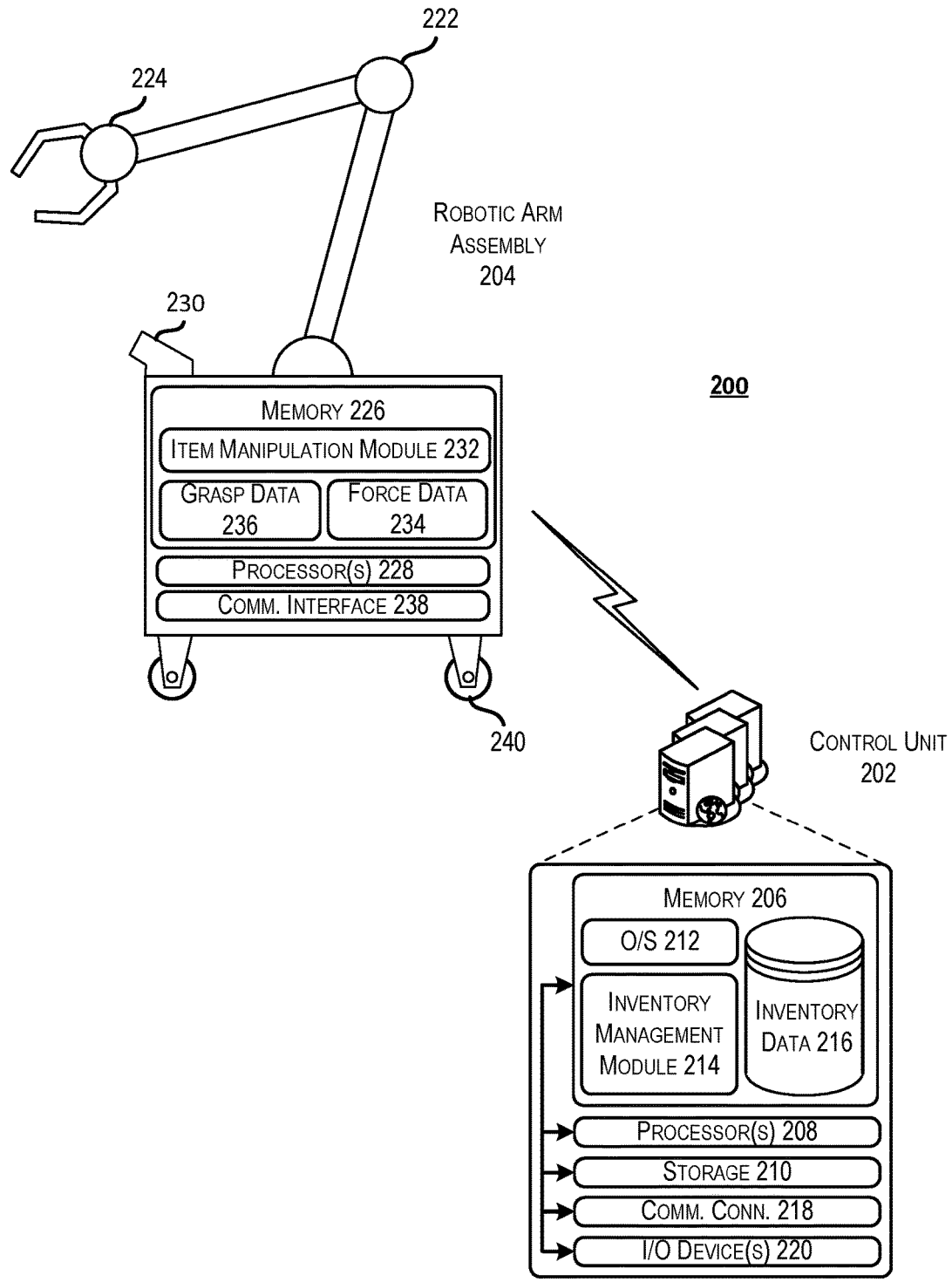
FIG. 2 illustrates an example inventory system architecture that may be implemented in accordance with embodiments of the disclosure.

FIG. 2 illustrates an example inventory system architecture that may be implemented in accordance with embodiments of the disclosure. In architecture 200, a control unit 202 may be in communication with inventory management components, such as a robotic arm assembly 204.

The control unit 202 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the control unit 202 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the control unit 202 may include at least one memory 206 and one or more processing units (or processor(s)) 208. The processor(s) 208 may be implemented as appropriate in hardware, computer-executable instructions, firmware or combinations thereof. Computer-executable instruction or firmware implementations of the processor(s) 208 may include computer-executable or machine executable instructions written in any suitable programming language to perform the various functions described.

The memory 206 may store program instructions that are loadable and executable on the processor(s) 208, as well as data generated during the execution of these programs. Depending on the configuration and type of control unit 202, the memory 206 may be volatile (such as random access memory (RAM)) and/or non-volatile (such as read-only memory (ROM), flash memory, etc.). The control unit 202 may also include additional storage 210, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 206 may include multiple different types of memory, such as static random access memory (SRAM), dynamic random access memory (DRAM) or ROM. Turning to the contents of the memory 206 in more detail, the memory 206 may include an operating system 212 and one or more application programs or services for implementing the features disclosed herein including at least a module for managing stowage and retrieval of items in the inventory system (inventory management module 214). The memory 206 may also include inventory data 216, which provides information associated with items managed by the inventory system. In some embodiments, the inventory data 216 may be stored in a database.

The memory 206 and the additional storage 210, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are installed on and/or executed from the control unit 202. The control unit 202 may also contain communications connection(s) 218 that allow the control unit 202 to communicate with a stored database, another computing device or server, user terminals, and/or other components of the inventory system. The control unit 202 may also include input/output (I/O) device(s) and/or ports 220, such as for enabling connection with a keyboard, a mouse, a pen, a voice input device, a touch input device, a display, speakers, a printer, etc.

Turning to the contents of the memory 206 in more detail, the memory 206 may include an operating system 212, a database containing inventory data 216 and the one or more application programs or services for implementing the features disclosed herein, including an inventory management module 214.

In some embodiments, the inventory management module 214 may be configured to, in conjunction with the processors 208, manage stowage and retrieval of items. In some embodiments, the inventory management module 214 may be configured to identify items to be retrieved from storage locations (e.g., in order to be shipped in a fulfillment order), identify placement locations in which to stow items, determine routing information to be used by components of the inventory system, and perform any other suitable inventory management tasks.

Inventory data 216 may be predetermined or it may be dynamically generated. For example, force limit and/or compressibility data associated with an item may be updated as new information is received for that item. In some embodiments, the inventory data 216 may include information related to grasping of items. In some embodiments, the inventory data 216 may include information related to a pose that is appropriate for one or more items. Force limit information may be stored in relation to particular item poses. For example, an item may have different force limits associated with different particular poses.

The robotic arm assembly 204 may comprise any robotic device configured to move items from one location to another. The robotic arm assembly 204 may comprise a mechanical arm 222 with an EOAT 224. In some embodiments, the EOAT 224 may be detachable. For example, the EOAT may be configured to be attached and unattached to the mechanical arm 222. In some embodiments, an EOAT may be selected that is appropriate for manipulating a particular item. The robotic arm assembly 204 may comprise a number of mechanisms for varying a compliance of the robotic arm assembly 204. For example, the robotic arm assembly 204 may comprise one or more compliance variation mechanisms. In some embodiments, a force feedback may be used to control the power being applied at a joint, effecting the mechanical impedance of the joint. In some embodiments, the robotic arm assembly 204 may comprise one or more series elastic actuators, in which a spring and/or controlled deflection mechanism is placed between a motor and the joint it actuates in order to effect the mechanical impedance. In some embodiments, the robotic arm assembly 204 may comprise one or more variable compliance actuators, in which a spring constant of the actuator may be altered in real time. In some embodiments, the robotic arm assembly 204 may comprise one or more variable compliance joints, in which the stiffness of an under-actuated element may be changed to effect mechanical impedance. In some embodiments, the robotic arm assembly 204 may comprise one or more soft robotics, in which bladders can be filled/drained to change the compliance of an elastomer based joint.

In one illustrative configuration, the robotic arm assembly 204 may include at least one memory 226 and one or more processing units (or processor(s)) 228. The processor(s) 228 may be implemented as appropriate in hardware, computer-executable instructions, firmware or combinations thereof. Computer-executable instruction or firmware implementations of the processor(s) 228 may include computer-executable or machine executable instructions written in any suitable programming language to perform the various functions described. Additionally, the robotic arm assembly 204 may comprise a number of input sensors 230, which detect and provide input related to conditions of an environment that the robotic arm assembly 204 is located within.

The memory 226 may store program instructions that are loadable and executable on the processor(s) 228, as well as data generated during the execution of these programs. The memory 226 may include one or more application programs or services for implementing the features disclosed herein including at least a module for determining how to manipulate an item (item manipulation module 232). The memory 226 may also include item force data 234, which provides information associated with forces that may be applied to items managed by the inventory system. The memory 226 may also include item grasp data 236, which provides information associated with grasping requirements/strategies for items managed by the inventory system.

In accordance with at least some embodiments, the item manipulation module 232 may be configured to, in conjunction with the processors 228, determine an appropriate strategy to be used in manipulating an item. For example, the item manipulation module 232 may be configured to determine an appropriate grasp to be used on an item from grasp data 236. In another example, the item manipulation module 232 may be configured to determine an appropriate level of force to be applied to an item from the force data 234. The item manipulation module 232 may be configured to cause an EOAT 224 to apply the determined level of force to the item in order to stow the item.

The robotic arm assembly 204 may include a communication interface 238 that allows the robotic arm assembly 204 to communicate with the control unit 202, another computing device or server, user terminals, and/or other components of the inventory system. In some embodiments, the communication interface 238 may comprise a wireless communication mechanism. In some embodiments, the communication interface 238 may comprise a physical wired connection with other components of the system.

In some embodiments, the robotic arm assembly 204 may be stationary (e.g., incapable of movement). In some embodiments, the robotic arm assembly 204 may be mobile, in that the robotic arm assembly 204 is configured to traverse from a first location to a second location. For example, the robotic arm assembly 204 may be configured to pick up an item at a first location, receive instructions to place the item at a second location, traverse to the second location, and place the item at the second location. In these embodiments, the robotic arm assembly 204 may comprise any suitable mobility means 240. For example, the robotic arm assembly 204 may include wheels and a motorized engine, such that the robotic arm assembly 204 is capable of autonomous movement. In this example, the memory 226 may include a set of computer-executable instructions configured to perform route guidance. In another example, the robotic arm assembly 204 may be located on a track or conveyor belt.

Figure 3:
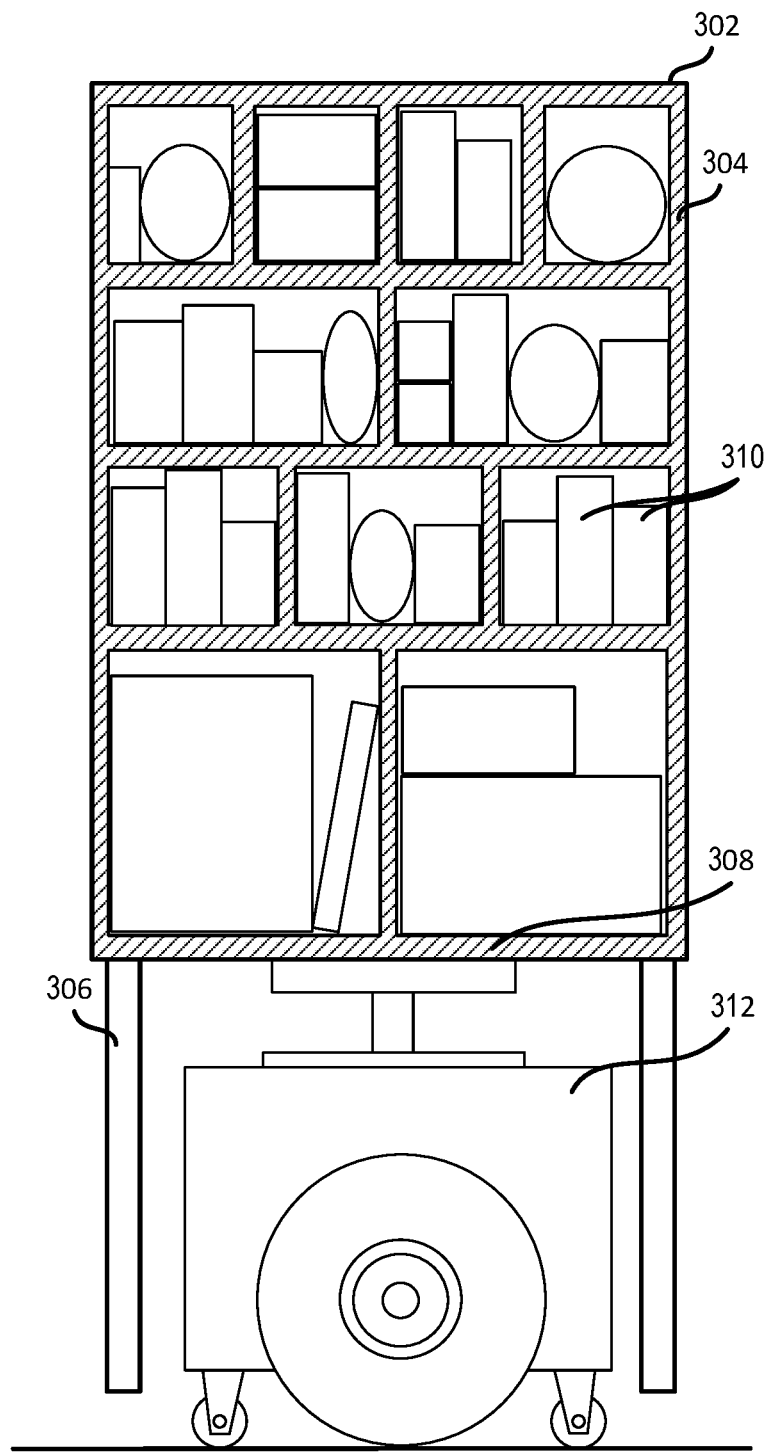
FIG. 3 illustrates in greater detail the components of a particular embodiment of an inventory holder.

FIG. 3 illustrates in greater detail the components of a particular embodiment of an inventory holder. In particular, FIG. 3 illustrates the structure and contents of one side of an example inventory holder 302. In a particular embodiment, inventory holder 302 may comprise any number of faces with similar or different structure. As illustrated, inventory holder 302 may include a frame 304, a plurality of legs 306, and a docking surface 308. In some embodiments the inventory holder 302 may be configured to be moved and/or rotated by a mobile drive unit 312.

Frame 304 may hold a number of inventory items 310. Frame 304 may provide storage space for storing inventory items 310 external or internal to frame 304. The storage space provided by frame 304 may be divided into a plurality of storage locations, each capable of holding inventory items 310. The storage locations may include any appropriate storage elements, such as bins, compartments, or hooks. In some embodiments, the frame 304 may be comprised of elastic or otherwise compressible material. In these embodiments, an inventory system may account for the elasticity of the frame 304 when determining an appropriate amount of force to be applied to an item. In some embodiments, the frame 304 may be considered an item with respect to item placement (e.g., a compressibility of the frame 304 may be assessed when determining a total compressibility of the items in the vicinity of a storage location). For example, the frame and storage bins may comprise a compressible material.

Additionally, each inventory holder 302 may include a plurality of faces, and each storage location may be accessible through one or more faces of the inventory holder 302. For example, in a particular embodiment, inventory holder 302 may include four faces. In such an embodiment, storage locations located at a corner of two faces may be accessible through either of those two faces, while each of the other storage locations may be accessible through an opening in one of the four faces. In some embodiments, an inventory holder 302 may be rotated (e.g., via a mobile drive unit 312) at appropriate times to present a particular face and storage location associated with that face to an operator or other components of the inventory system. In accordance with at least some embodiments, the inventory holder 302 may be moved to a robotic arm in order to facilitate stowage of an item into the inventory holder 302 by that robotic arm.

Inventory items represent any objects suitable for storage, retrieval, and/or processing in an automated inventory system. For the purposes of this description, inventory items may represent any one or more objects of a particular type that are stored in inventory system. Thus, a particular inventory holder 302 may store a particular inventory item if the inventory holder 302 currently holds one or more units of that type. As one example, inventory system may represent a mail order warehouse facility, or other fulfillment center, and inventory items may represent merchandise stored in the warehouse facility. During operation, a mobile drive unit 312 may retrieve an inventory holder 302 that contains one or more inventory items requested in an order to be packed for delivery to a customer or inventory holders 302 carrying pallets containing aggregated collections of inventory items for shipment. Moreover, in particular embodiments of the inventory system, boxes containing completed orders may themselves represent inventory items.

As described above, the inventory holder 302 may be configured to be moved by a mobile drive unit 312. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 312 represent elements of a tracked inventory system configured to move an inventory holder 302 along tracks, rails, cables, crane system, or other guidance or support elements traversing workspace. In such an embodiment, a mobile drive units 312 may receive power and/or support through a connection to the guidance elements, such as a powered rail. Additionally, in particular embodiments of inventory system, a mobile drive unit 312 may be configured to utilize alternative conveyance equipment to move within a workspace and/or between separate portions of the workspace.

Figure 4:
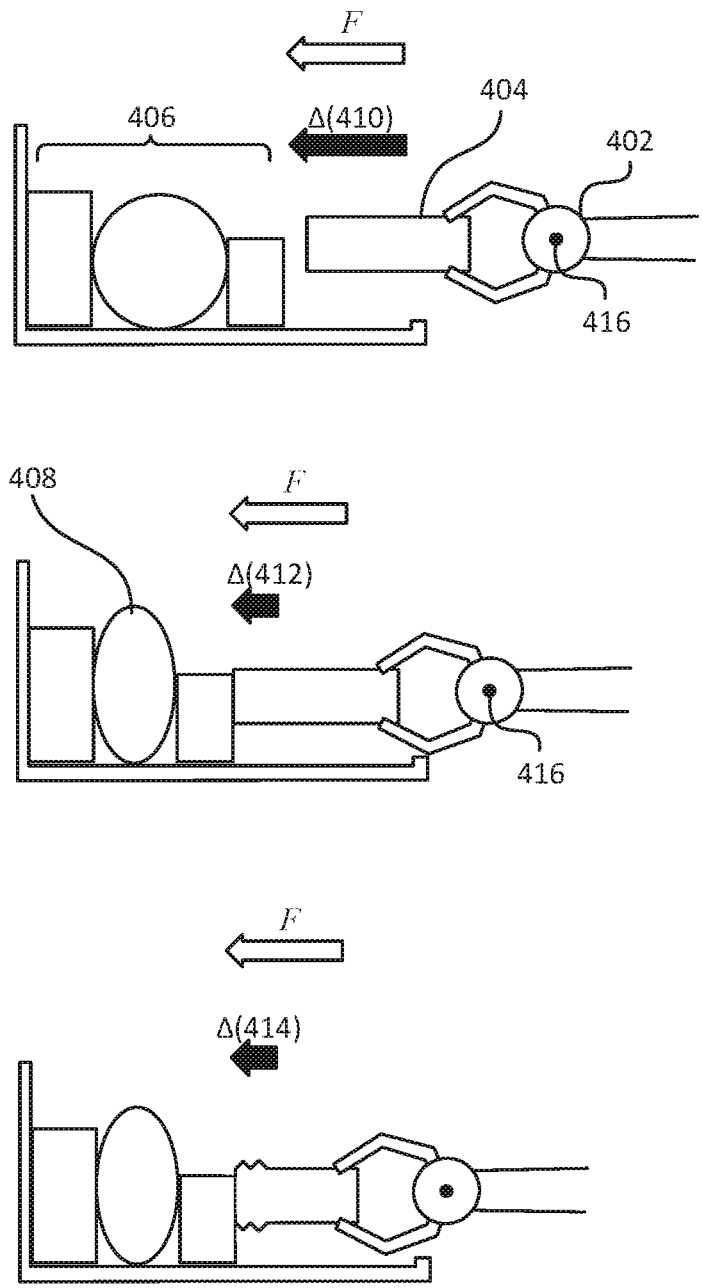
FIG. 4 depicts a technique for learning force limits for items in accordance with at least some embodiments.

FIG. 4 depicts a technique for learning force limits for items in accordance with at least some embodiments. In accordance with at least some embodiments, the techniques described with respect to FIG. 4 may be implemented by an inventory management system that includes a robotic arm assembly 402. In embodiments of the disclosure, the robotic arm assembly may grasp an item 404 in order to store the item in a storage location with a set of stored items 406. At least some items 408 of the set of stored items may be compressible. In some embodiments, a robotic arm assembly may comprise a number of compliance variation mechanisms. Examples of such compliance variation mechanisms are disclosed in U.S. Pat. No. 10/207,868, issued on Feb. 19, 2019, titled "VARIABLE COMPLIANCE EOAT FOR OPTIMIZATION OF GCU," the entirety of which is herein incorporated by reference.

In some embodiments, the robotic arm assembly 402 may be configured to, while grasping the item 404, apply a constant force F in the direction of a storage location. In some embodiments, force F may be a level of force determined based on a type of the item being grasped. For example, upon identifying an item 404 to be grasped by the robotic arm assembly, the inventory system may determine an initial level of force to be applied to that item 404. For example, the inventory system may receive instructions to store Item A. Upon receiving these instructions, the inventory system may query a force limit database to determine a maximum amount of force F that may be applied to that item 404.

While applying a constant force F, the inventory management system may monitor a delta (Δ), or change, in the position of the item 404 with respect to time. Upon coming into contact with the set of items 406, the inventory management system may be configured to cause the robotic arm assembly to push the item 404 up against the set of items 406 (e.g., by maintaining the constant force). The inventory system may then monitor the change in position of the item 404 with respect to time while the constant force F is applied to the item 404 and the set of items 406. It is expected that, with constant force being applied, the rate of change in position of an EOAT of the robotic arm assembly 402 should decrease as the item 404 and each item in the set of items 406 reaches its force limit. The inventory system may utilize machine vision techniques to monitor the change in position of the item 404.

Initially, all of force F exerted by the EOAT of the robotic arm assembly 402 is used to counter friction and compress items 406 and item 404. As each item is compressed, that item exerts an amount of force against the EOAT. The amount of force exerted by the items against the EOAT is correlated to an amount that those items are compressed. Hence, once each of the items in the set of items 406 (as well as item 404) is compressed to a certain degree, the force exerted by those items against the EOAT will counter force F. Accordingly, while applying force F, the EOAT will initially move at a velocity, where the velocity represents a change in position with respect to time. As each item is compressed, the velocity of the EOAT will approach zero (i.e., the movement of the EOAT will decrease) as the force exerted by the compressed items approaches the force F. The inventory system is configured to monitor the velocity of the EOAT by monitoring a change in position of the EOAT with respect to time. If the inventory system detects that the velocity is changing at an unexpected rate (e.g., an unexpectedly high rate or an unexpectedly low rate), then the inventory system may determine that the force F exerted by the EOAT is either too high or too low.

As the rate of change in position decreases with respect to time, the inventory management system may calculate a force limit for the item 404. The force limit may represent the maximum amount of compression energy that may be applied to the item 404 without breakage occurring. For example, the inventory system may identify a first delta 410 in the position of the item 404 between time $T_0$ and time $T_1$. The inventory system may continue to monitor the position of the item 404 to detect a second delta 412 in the position of item 404 between time $T_1$ and time $T_2$. Based on the difference in these deltas, the inventory system may determine what amount of energy is being transferred into something other than kinetic energy and friction. As the delta in position over time of the item 404 approaches zero, the inventory system may determine a force limit for the item 404. Additionally, a maximum compression/compressibility of the item 404 (e.g., a size of the item while compressed) may be recorded for use in identifying storage locations for the item 404. For example, to optimize GCU, the inventory system may identify a storage location that is large enough to store the item in at least a partially compressed state.

In accordance with embodiments of the disclosure, the inventory system may account for each of the items in the set of items 406. For example, the inventory system may access recorded data for each of the items in the set of items 406 that the item 404 is to come into contact with. The inventory system may then determine a total compressibility of the items in the set of items 406, which may be used to better optimize GCU during storage of items. In some embodiments, force F may be chosen such that it corresponds to the lowest force limit of each of the items in the set of items 406 and the item 404.

Between time $T_2$ and time $T_3$, the inventory system may detect a delta 414 that represents a sudden increase in the change in position of the item 404. This may indicate that the item has broken. In some embodiments, the inventory system may flag the item 404 to be inspected by quality assurance personnel upon detecting a potential break. The quality assurance personnel may be provided the opportunity to give the inventory system feedback as to the status of the item 404. Based on this feedback, the inventory system may adjust force limit data for the item 404. In some embodiments, machine vision techniques may be used to detect broken items in real time.

In some embodiments, items found damaged in the inventory system are recorded. Additionally, each of the items that were touching the damaged item while it was in storage may be recorded. As items are constantly moving in and out of inventory, this may comprise multiple items. By using one or more data mining and/or machine learning techniques, a correlation between the damaged item, the damage, the items that were touching the damaged item, and the energy applied to the item may be found. This may be used to identify certain items that have a tendency to damage other items, but not themselves, when certain energy levels are applied. Items that are found to be damaged also may not comply with packaging standards and may be marked to have additional packaging added during receiving of the item.

In some embodiments, the inventory system may detect deltas in a position of an item by monitoring the position of a marking 416 on the end effector. In embodiments of the disclosure, a suitable marking may be any indicator that is recognizable using machine vision and can act to relay a change in position of the end effector and/or an item grasped by the end effector.

In accordance with embodiments of the disclosure, the inventory system may assign a spring constant to one or more of the items managed in the inventory system. The inventory system may apply one or more equations based on that spring constant to determine the force to be applied to the item. It should be noted that Hooke's law applies to the items managed by the inventory system. Hooke's law is a principle of physics that states that the force F needed to extend or compress a spring by some distance X is proportional to that distance. That is: F=kX, where k is a spring constant (e.g., a constant factor characteristic of the spring's stiffness), and X is small compared to the total possible deformation of the spring. In some embodiments, the inventory system may calculate a particular spring constant for an item by monitoring a change in the item's position. For example, if, while applying an initial force f to an item, the item moves a distance x, then the spring constant may be identified as fix. The inventory system may then determine a total compressibility c of the item (e.g., a total allowable change in position of the item that will not result in some permanent deformation or change of state of the item). Based on this, a force limit F may be calculated as F=(f/x)*c.

In accordance with embodiments of the disclosure, force limit F may be calculated for each item to correspond to a level of energy that is "safe" for that item ($E_{safe}$). In some embodiments, $E_{safe}$ may be identified as some fraction of energy determined to result in no damage to the item ($E_{no\_damage}$) such that this amount of energy is safe to expose items to in order to compress them. For example, using a safety factor sf $E_{safe}=E_{no\_damage}/sf$, where sf is greater than 1. In some embodiments, $E_{no\_damage}$ may be estimated based on standards associated with an item's packaging. For example, it may be assumed that the item packaging complies with a shipping standard's (e.g., ASTM) compression test. The energy $E_{no\_damage}$ that an item's container can withstand before damage to the item occurs can be calculated using this standard. In some embodiments, $E_{safe}$ and/or $E_{no\_damage}$ may be calculated based on a geometry and mass of each item. In some embodiments, $E_{safe}$ and/or $E_{no\_damage}$ may be estimated based on a category of an item. For example, when the inventory system receives a new item, that item may inherit an initial $E_{safe}$ and/or $E_{no\_damage}$ based on its category (e.g., if the new item is a particular book, then the item may be associated with an $E_{safe}$ and/or $E_{no\_damage}$ associated with books). These energy values may be adjusted later using the techniques described here. An amount of force to be applied to each item may be calculated based on these energy values.

FIG. 5A depicts a first illustrative example of a process for storing items using learned force limits to optimize GCU. In FIG. 5A, a robotic manipulator is depicted as storing an item 502 into a container device that includes a set of items 504. The inventory management system may identify that there is a storage space 506 open within the set of items 504. The storage space 506 may be assessed to determine whether it is an appropriate size for the item 502. In some embodiments, the storage space 506 may be selected based on a fragility of the item 502. For example, fragile items may be stored in specified storage locations and/or in proximity of particular types of items. The inventory management system may determine that the storage space 506 is appropriate for the item 502 based on other items located proximate to the storage space 506. For example, the inventory system may identify one or more compressible items 508 within the set of items 504 that may be compressed to make space for the item 502.

In accordance with some embodiments, the inventory system may identify a number of compressible items 508 within the set of items 504. The inventory system may determine a maximum amount that the items in the set of items 504 and/or the item 502 may be compressed as well as a safe amount of force F that may be applied to the items in the set of items 504 during storage in order to compress and/or push items. Upon determining the force F to be applied to the set of items 504, the inventory system may cause the robotic arm to push the item 502 into the storage space using the determined force F. While stowing the item 502 in the storage location 506, the inventory system may monitor changes in position of the item 502. If the inventory system determines that the item position is not changing as expected, the inventory system may update the force limit associated with the item 502. As depicted, the robotic arm may push one or more items to the side in order to make room for the item 502 and push the item 502 into the storage location 506.

In accordance with embodiments, the inventory system may identify a pose in which an item is to be stored. A pose may be defined as a position and orientation of an item relative to some other item. Here the other item may be the storage container that the item is placed into. In some embodiments, all items in the same storage container may have the same coordinate system when referring to pose.

FIG. 5B depicts a second illustrative example of a process for storing items using learned force limits to optimize GCU. In FIG. 5B, a robotic manipulator is depicted as stowing an item 510 into a container device that includes a set of items 512. The inventory management system may identify that there is a storage space 514 open within the set of items 512. The storage space 514 may be assessed to determine whether it is an appropriate size for the item 510. In its assessment, the inventory management system may identify that at least one item 516 within the set of items 512 is a compressible item (e.g., an item that may be compressed at least partially without damage or unacceptable deformation) based on force limit data associated with the item 510. Upon determining at least one item 516 within the set of items 512 is a compressible item, the inventory management system may calculate an amount that the at least one compressible item 516 may be compressed and/or an amount the at least one compressible item 516 has already been compressed. A usable size of the storage space 514 may then be calculated based on the actual size of the storage space 514 as well as the amount that the at least one compressible item 516 may (further) be compressed. The storage space 514 may be determined to be appropriate for the item 510 based on the usable size of the storage space 514. In some embodiments, the storage space 514 may be determined to be appropriate to house the item 510 in a compressed state.

Upon determining that a usable size of the storage space is adequate for the item 510 (in either a compressed or uncompressed state), a robotic arm assembly may place the item 510 proximate to the storage space 514, determine a level of force F safe for the item 510 (as well as the set of items 512), and insert the item 510 into the storage space 514 by applying the force F. To do this, the item 510 may be pushed against other items in the set of items 512 at the determined force F. For example, the item 510 may be pushed against other items in the direction of the at least one compressible item 516 in order to compress the at least one compressible item 516 and increase the size of the storage space 514. Once the item 510 has been inserted into the storage space 514, the compressible item 516 may be allowed to decompress.

Figure 6:
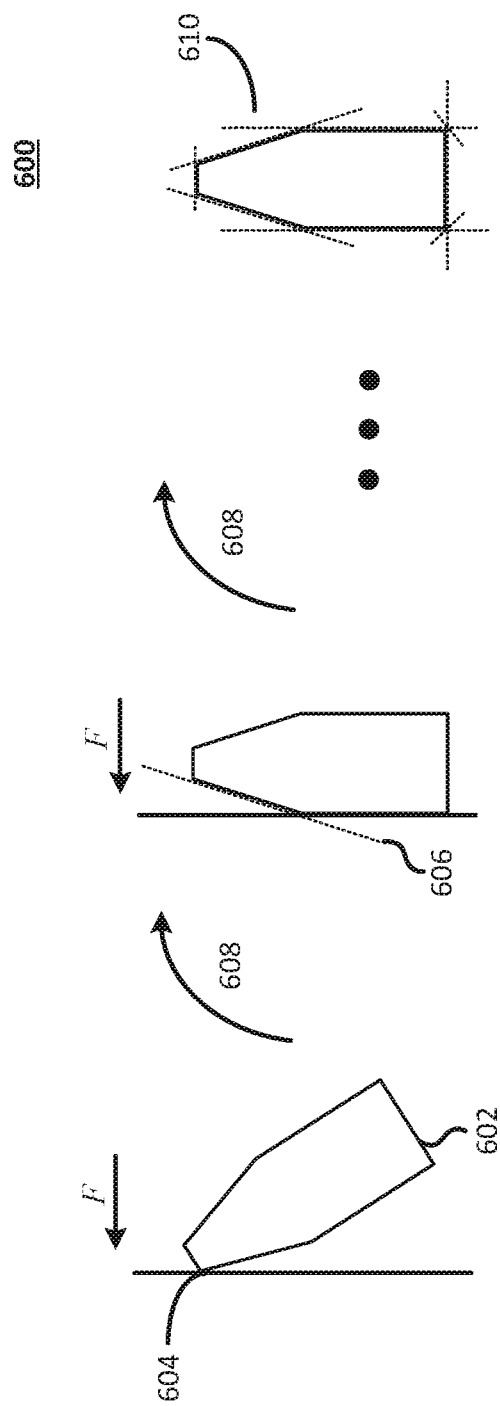
FIG. 6 depicts a process for generating bounding boxes to optimize gross cubic utilization in accordance with at least some embodiments.

FIG. 6 depicts a process 600 for generating bounding boxes to optimize gross cubic utilization in accordance with at least some embodiments. In process 600, the inventory system may generate a bounding box for an item 602. In process 600, an item 602 may be grasped by a robotic arm. Once grasped, the item 602 may be pushed against or bumped into an object 604 (e.g., a wall) with a known location. The inventory system may monitor the position of the item 602 to determine when contact is made with the object 604. Based on the distance to the object 604, the inventory system may determine a bounding line 606 for the item 602. The grasped item 602 may then be subjected to a rotation 608. This process may be repeated a number of times to identify a bounding box 610 for the item.

In some embodiments, the bumps can be detected using force detection or by limiting the force on a manipulator on the robotic arm assembly and monitoring the position of the manipulator. When the manipulator stops moving it is assumed that the item has made contact with the object 604. Depending on the desired resolution of the resulting bounding box 610, the item 602 can be rotated in small increments and repeatedly bumped into the object 604. Using the distances of the manipulator from the known object 604, a bounding box 610 (e.g., a geometric model) of the item 602 can be generated, combining the information gathered from several contacts with the object 604. In some embodiments, the bounding box 610 may be used to identify an appropriate storage location for the item 602.

In some embodiments, the system may be configured to determine multiple force limits for a single item. For example, the system may be configured to determine different force limits and/or maximum compression distances that can be applied to an item in different directions. This may allow the system to create a force model for an item which includes information on forces that may be applied to the item in all possible compression directions. In some embodiments, this may enable the inventory system to identify an appropriate pose in which to store the item (e.g., to result in pushing the item in the direction associated with the highest force limit). In some embodiments, the inventory system may use this force model to determine an appropriate placement location for the item. For example, the inventory system may assess each potential placement location based a size and shape of the item with respect to each direction as well as a force limit with respect to each direction.

Figure 7:
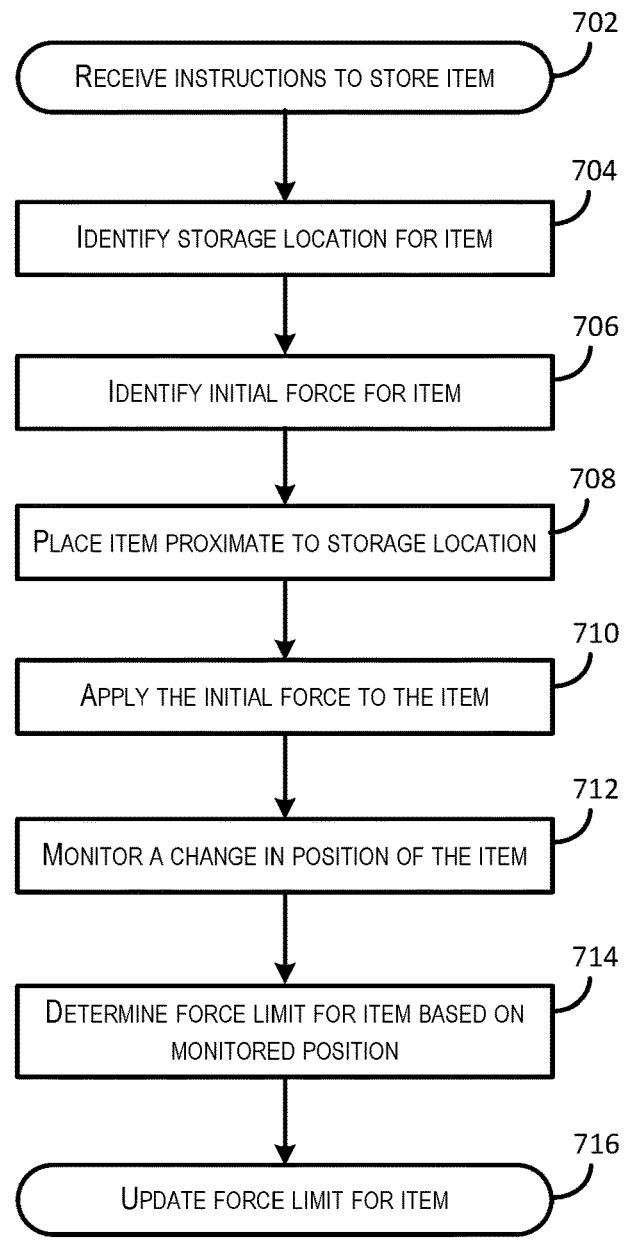
FIG. 7 depicts a method for learning/adjusting force limits in accordance with at least some embodiments.

FIG. 7 depicts a process for learning/adjusting force limits in accordance with at least some embodiments. Some or all of the process 700 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 700 of FIG. 7 may be performed by at least the described inventory system. The code may be stored on a computer-readable storage medium, for example, in the form of a computer program including a plurality of instructions executable by one or more processors. The computer-readable storage medium may be non-transitory.

Process 700 may begin at 702, when the inventory system receives instructions to store an item. In some embodiments, the inventory system may receive one or more items at a fulfillment center to be added to inventory storage. The inventory system may identify a way in which the item may be grasped. In some embodiments, the inventory system may identify an appropriate EOAT to be used with the item. For example, the inventory system may select a type of EOAT to be used based on a type associated with the item.

At 704, the inventory system may identify an appropriate storage location for the item. In some embodiments, the storage location may be identified based on a size, weight, or type of item to be stored. In some embodiments, the inventory system may determine a compressibility of the item to be stored and may select an appropriate storage location that is large enough to accommodate the item in at least a partially compressed state. In some embodiments, the storage location may be selected based on items within the vicinity of the storage location. For example, the inventory system may determine that a storage location may be expanded by compressing a number of compressible items within the vicinity of the storage location.

At 706, the inventory system may identify an initial force that may be applied to the item. In some embodiments, the initial force may be a default force limit assigned to the item. In some embodiments, a default force limit may be determined based on a size and mass of the item. For example, the default force limit may be calculated as a function of the item's mass and size. In some embodiments, a default force limit may be determined based on a category or type of the item being stored.

At 708, the inventory system may place the item proximate to the identified storage location. In some embodiments, a mobile drive unit may retrieve an inventory holder associated with the storage location and bring it to a robotic arm that will place the item in the identified storage location.

At 710, the inventory system may cause the robotic arm to apply the determined force to the item. For example, the robotic arm may move the item against the other items in the vicinity of the storage location to expand the storage location. In some embodiments, the inventory system may push the item against other items to compress that item and/or the other items.

At 712, the inventory system may monitor changes in the position of the item. For example, the inventory system may, by applying the determined force to the item, move the item into the storage location while tracking the item's movement. Upon determining that the changes in position have decreased or stopped, the inventory system may determine an amount of energy that is being converted by the item (and/or other items in the vicinity) into energy other than kinetic energy. Based on the potential conversion of energy, the inventory system may determine an amount of energy that the item is (and/or other items in the vicinity are) able to absorb.

At 714, the inventory system may determine a new force limit for the item. Upon detecting an unexpected change in the position of the item, the inventory system may calculate a new force limit based on the change of position of the item with respect to time. For example, if the item stops moving before an expected stopping point, then the inventory system may determine that the true force limit for the item is lower than the expected force limit. The inventory system may calculate a new force limit based on that determination. At 716, the inventory system may update the force limit for the item based on the determined force limit.

Figure 8:
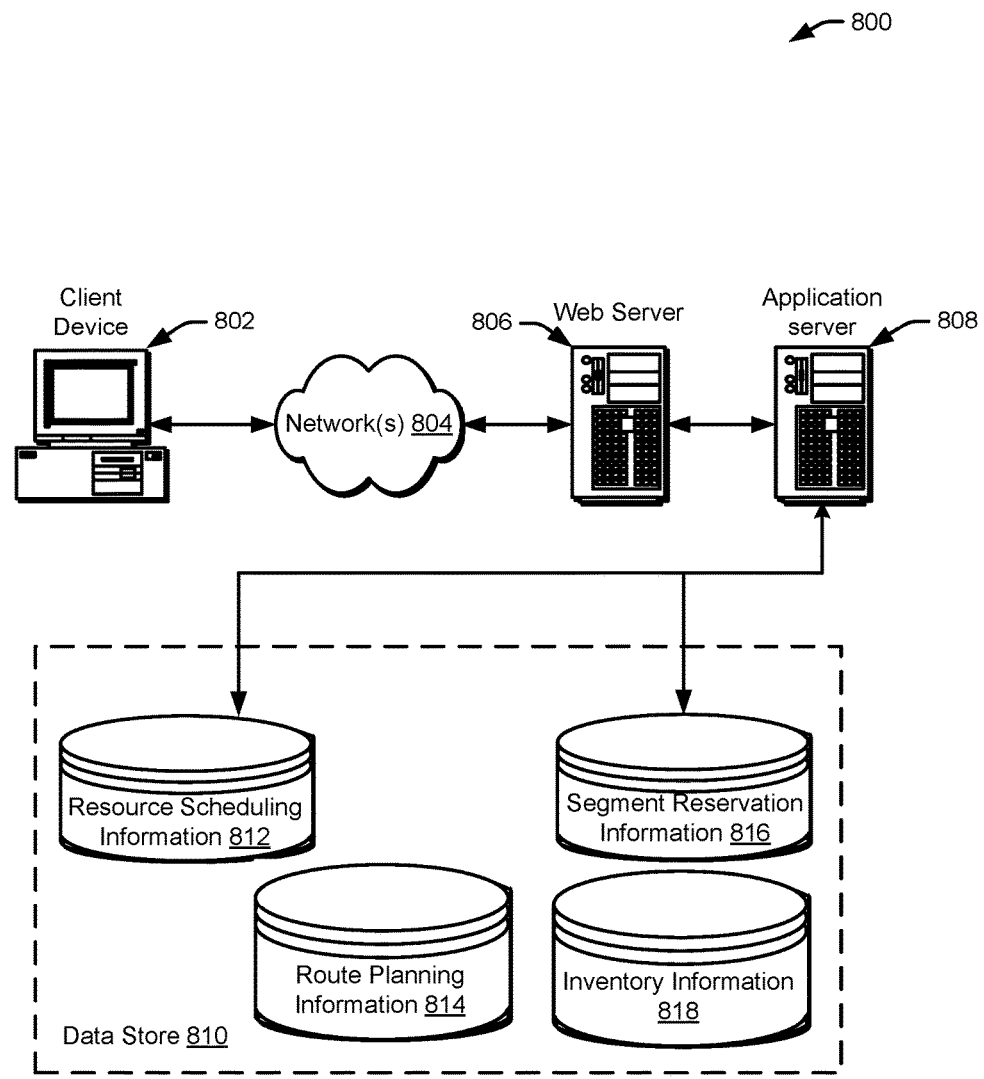
FIG. 8 illustrates an environment in which various features of the inventory system can be implemented, in accordance with at least one embodiment.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing information which can be used by modules described herein, such as resource scheduling information 812, route planning information 814, segment reservation information 816, and/or inventory information 818. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk®. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
    identifying a placement location for an item associated with force limit information;
    determining a current force limit associated with the item;
    causing a robotic arm to position the item proximate to the placement location;
    causing the robotic arm to apply the current force limit to move the item against one or more additional items;
    while applying the current force limit to the item, monitoring a rate of change in the position of the item with respect to time;
    calculating, based on the rate of change in the position of the item, a new force limit for the item; and
    updating the force limit information for the item with the new force limit.

2. The computer-implemented method of claim 1, wherein the current force limit is determined based on a type of the item.

3. The computer-implemented method of claim 1, wherein the current force limit is determined based on a size and mass of the item.

4. The computer-implemented method of claim 1, wherein the placement location is determined based at least in part on a size or shape of the item.

5. An inventory management system comprising:
    at least one robotic arm assembly;
    a processor; and
    a memory including instructions that, when executed by the processor, cause the inventory management system to, at least:
    remove an item from a first location;
    determine a second location to receive the item, the second location determined based on an attribute of the item;
    determine a level of force to be applied to the item;
    move the item into the second location by applying the determined level of force;
    monitor a rate of change in position of the item with respect to time; and
    update the level of force based on the rate of change in the position of the item.

6. The inventory management system of claim 5, wherein the attribute of the item is a size or shape of the item.

7. The inventory management system of claim 5, wherein the second location is determined to maximize a number of items stored in an inventory space.

8. The inventory management system of claim 5, wherein the attribute of the item is a fragility of the item.

9. The inventory management system of claim 5, wherein the level of force is updated based on determining that the rate of change in the position of the item is below a threshold value.

10. The inventory management system of claim 5, wherein the instructions further cause the inventory management system to determine a compressible size of the item based on the level of force.

11. The inventory management system of claim 5, wherein the rate of change in the position of the item decreases with respect to time.

12. The inventory management system of claim 11, wherein the level of force is calculated based on a negative slope of the rate of change in the position.

13. An inventory system, comprising:
- a robotic arm configured to interact with one or more inventory items;
- a processor; and
- a memory including instructions that, when executed by the processor, cause the inventory system to, at least:
  - identify a placement location for an item associated with force limit information;
  - determine a current force limit associated with the item;
  - cause the robotic arm to position the item proximate to the placement location;
  - cause the robotic arm to apply the current force limit to move the item against one or more additional items;
  - while applying the current force limit to the item, monitor a rate of change in the position of the item with respect to time;
  - calculate, based on the rate of change in the position of the item, a new force limit for the item; and
  - update force limit information for the item with the new force limit.

14. The inventory system of claim 13, wherein the instructions, when executed by the processor, further cause the inventory system to identify the item using one or more image processing techniques.

15. The inventory system of claim 13, wherein the instructions, when executed by the processor, further cause the inventory system to determine a pose appropriate for the item.

16. The inventory system of claim 15, wherein moving the item against the one or more additional items comprises manipulating the item into the determined pose.

17. The inventory system of claim 13, wherein moving the item against the one or more additional items comprises pushing the item against the one or more additional items to position the item in a storage location.

18. The inventory system of claim 17, wherein the instructions, when executed by the processor, further cause the inventory system to determine a level of compressibility for at least one item of the one or more additional items.

19. The inventory system of claim 13, wherein the new force limit is calculated upon detecting that a value for the rate of change in the position of the item is different from an expected value, wherein the expected value is determined based on a level of compressibility associated with the item.

20. The inventory system of claim 13, wherein the rate of change in position of the item is monitored using one or more machine vision techniques.

* * * * *